(12) United States Patent
Burchette, Jr.

(10) Patent No.: US 6,991,155 B2
(45) Date of Patent: Jan. 31, 2006

(54) TRANSACTION CARD SYSTEM HAVING SECURITY AGAINST UNAUTHORIZED USAGE

(75) Inventor: Robert L. Burchette, Jr., Spartanburg, SC (US)

(73) Assignee: Laser Card, LLC, Boca Raton, FL (US)

( * ) Notice: Subject to any disclaimer, the term of this patent is extended or adjusted under 35 U.S.C. 154(b) by 0 days.

(21) Appl. No.: 10/300,010

(22) Filed: Nov. 19, 2002

(65) Prior Publication Data

US 2003/0106935 A1 Jun. 12, 2003

Related U.S. Application Data

(60) Provisional application No. 60/333,035, filed on Nov. 19, 2001.

(51) Int. Cl.
*G06F 17/60* (2006.01)

(52) U.S. Cl. .................................. 235/379; 235/380
(58) Field of Classification Search ................. 235/379, 235/380, 492, 382, 436
See application file for complete search history.

(56) References Cited

U.S. PATENT DOCUMENTS

| | | | |
|---|---|---|---|
| 4,582,985 A | 4/1986 | Löfberg | |
| 4,614,861 A | 9/1986 | Pavlov et al. | |
| 4,685,771 A | 8/1987 | West et al. | |
| 4,688,900 A | 8/1987 | Doane et al. | |
| 4,701,601 A | 10/1987 | Francini et al. | |
| 4,837,422 A | 6/1989 | Dethloff et al. | |
| 5,053,608 A | 10/1991 | Senanayake | |
| 5,180,901 A | 1/1993 | Hiramatsu | |
| 5,221,838 A * | 6/1993 | Gutman et al. | 235/379 |
| 5,272,319 A | 12/1993 | Rey | |
| 5,276,311 A | 1/1994 | Hennige | |
| 5,293,029 A * | 3/1994 | Iijima | 235/380 |
| 5,321,533 A | 6/1994 | Kumar | |
| 5,457,747 A | 10/1995 | Drexler et al. | |
| 5,478,994 A * | 12/1995 | Rahman et al. | 235/380 |
| 5,530,232 A | 6/1996 | Taylor | |
| 5,530,566 A | 6/1996 | Kumar | |
| 5,585,787 A | 12/1996 | Wallerstein | |
| 5,590,038 A | 12/1996 | Pitroda | |
| 5,623,552 A | 4/1997 | Lane | |
| 5,748,737 A | 5/1998 | Daggar | |
| 5,777,903 A * | 7/1998 | Piosenka et al. | 708/100 |
| 5,789,733 A * | 8/1998 | Jachimowicz et al. | 235/492 |
| 5,862,260 A | 1/1999 | Rhoads | |
| 5,920,640 A | 7/1999 | Salatino et al. | |
| 5,931,764 A | 8/1999 | Freeman et al. | |
| 5,949,508 A | 9/1999 | Kumar et al. | |
| 5,987,438 A | 11/1999 | Nakano et al. | |
| 6,012,636 A | 1/2000 | Smith | |
| 6,019,284 A | 2/2000 | Freeman et al. | |
| 6,068,183 A | 5/2000 | Freeman et al. | |
| 6,085,976 A | 7/2000 | Sehr | |
| 6,089,451 A | 7/2000 | Krause | |

(Continued)

OTHER PUBLICATIONS

Internet website located at: www.cardlogix.com/vault.html.

*Primary Examiner*—Daniel Stcyr
*Assistant Examiner*—Daniel A. Hess
(74) *Attorney, Agent, or Firm*—Nelson Mullins Riley & Scarborough LLP

(57) ABSTRACT

A system having a host having information regarding at least one transaction card account. The host functions to transfer card data to a drone card carried within the host. The host includes a biometric sensor or other suitable identification means for authentication of the user prior to use of the drone card. Once the user is authenticated, the drone card provides a readable identifier that corresponds to a transaction card account selected by the user. The functions of host could alternatively be integrated into the drone card.

56 Claims, 7 Drawing Sheets

U.S. PATENT DOCUMENTS

| | | |
|---|---|---|
| 6,095,416 A | 8/2000 | Grant et al. |
| 6,122,403 A | 9/2000 | Rhoads |
| 6,188,309 B1 | 2/2001 | Levine |
| 6,293,462 B1 | 9/2001 | Gangi |
| 6,315,195 B1 | 11/2001 | Ramachandran |
| 6,325,285 B1 | 12/2001 | Baratelli |
| 2001/0045454 A1 | 11/2001 | Gangi |
| 2001/0054148 A1 | 12/2001 | Hoornaert et al. |

\* cited by examiner

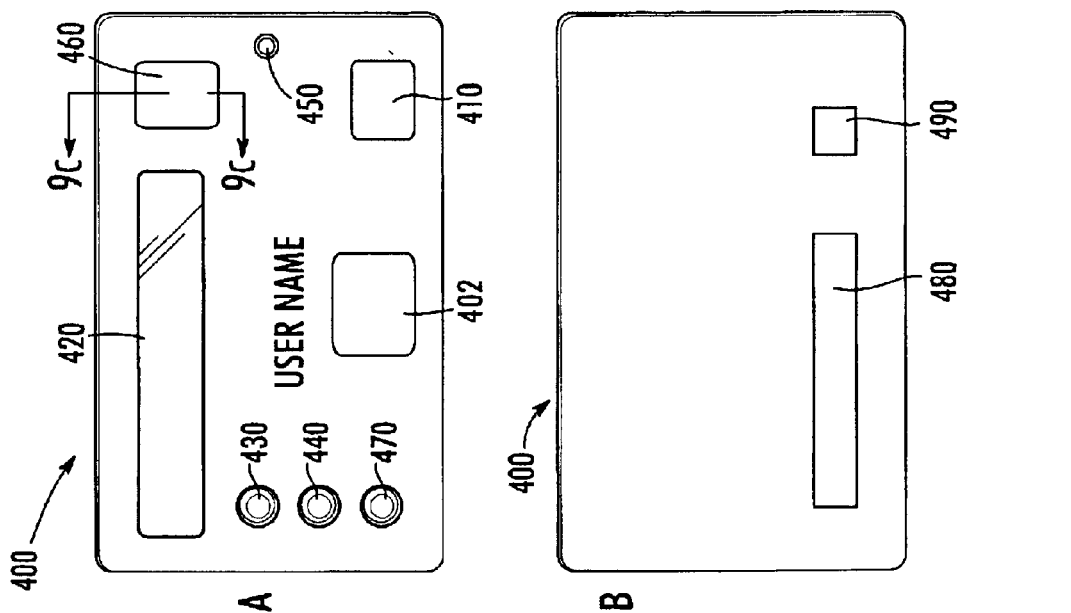
FIG. 8
FIG. 9A
FIG. 9B
FIG. 9C

TRANSACTION CARD SYSTEM HAVING SECURITY AGAINST UNAUTHORIZED USAGE

PRIORITY CLAIM

This application claims priority to Provisional Application No. 60/333,035, filed Nov. 19, 2001, which is hereby incorporated by reference.

BACKGROUND OF THE INVENTION

The present invention relates generally to the art of transaction cards. More particularly, the invention relates to an improved transaction card system having security features for preventing unauthorized usage.

Transaction cards, such as credit cards, debit cards, access cards and the like, have gained widespread use. While transaction cards provide convenience for users, fraudulent use is also prevalent. Fraudulent use may occur through postal theft, counterfeiting and through stolen cards. It is believed that credit card companies suffer losses due to fraud each year in the hundreds of millions of dollars. These losses must ultimately be borne by the consumer in the form of higher prices.

While there have been attempts to prevent fraudulent use of transaction cards, a further need exists for a novel transaction card system.

SUMMARY OF THE INVENTION

The present invention recognizes and addresses various drawbacks of prior art constructions and methods. Accordingly, it is an object of the present invention to provide an improved transaction card system having security features for preventing unauthorized usage.

The present invention provides a system having a host having information regarding at least one transaction card account. The host functions to transfer card data to a drone card carried within the host. The host includes a biometric sensor or other suitable identification means for authentication of the user prior to use of the drone card. Once the user is authenticated, the drone card provides a readable identifier that corresponds to a transaction card account selected by the user. It should be understood by one of ordinary skill in the art that the functions of host could alternatively be integrated into the drone card.

Other objects, features and aspects of the present invention are achieved by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 8 is a table showing transaction attempts for a drone card;

FIG. 9A is a front view of an encoded card according to an alternative embodiment;

FIG. 9B is a rear view of the encoded card of FIG. 9A;

FIG. 9C is a cross sectional view of a portion of the card along line 9C—9C of FIG. 9A;

Figure 1A:
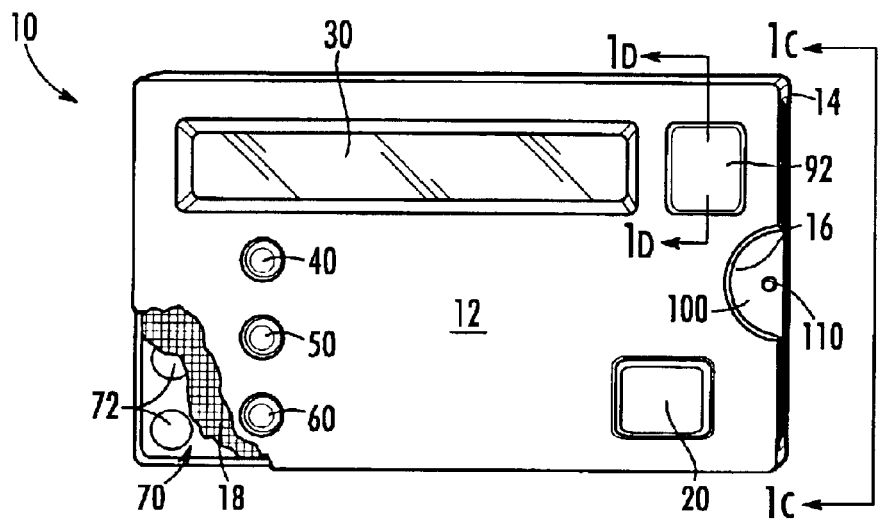
FIG. 1A is a front perspective view of a host and inserted drone card with the host having a portion partially cut away to reveal various internal components therein according to an embodiment of the present invention.

Repeat use of reference characters in the present specification and drawings is intended to represent same or analogous features or elements of the invention.

DETAILED DESCRIPTION OF PREFERRED EMBODIMENTS

Reference is made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can by made in the present invention without departing from the scope or spirit thereof. For example, features illustrated or described as part of one embodiment may be used on another embodiment to yield a still further embodiment.

In one embodiment, the present invention provides a host that houses information regarding one or more card accounts. A card account includes but is not limited to credit cards, debit cards, library cards, social security cards, Medicare cards, phone cards, access cards, discount cards, and any other card containing identification information relating to a specific person or group. A drone card carried within the host can be configured to correspond to a card account. Often, the host may be configured to allow the user to select a particular card account from among several. An enroller operates to program information regarding various card accounts on the host for individual or group usage.

Once initialized by the enroller, the host contains user information required for authentication as well as data relating to the card accounts. To use a specific card account stored on the host, the user is first authenticated using the host's authentication sensor. Upon selecting the desired card account, the host uploads data relating to the selected card account onto the drone card. The drone card may contain an output circuit that generates a readable identifier (i.e. magnetic signal, bar code, etc.) corresponding to the selected card account. Unless the drone card is used within a certain time period, it will preferably become disabled and need additional authentication to be used. Likewise, the drone card may become disabled upon completion of a transaction.

Figure 1B:
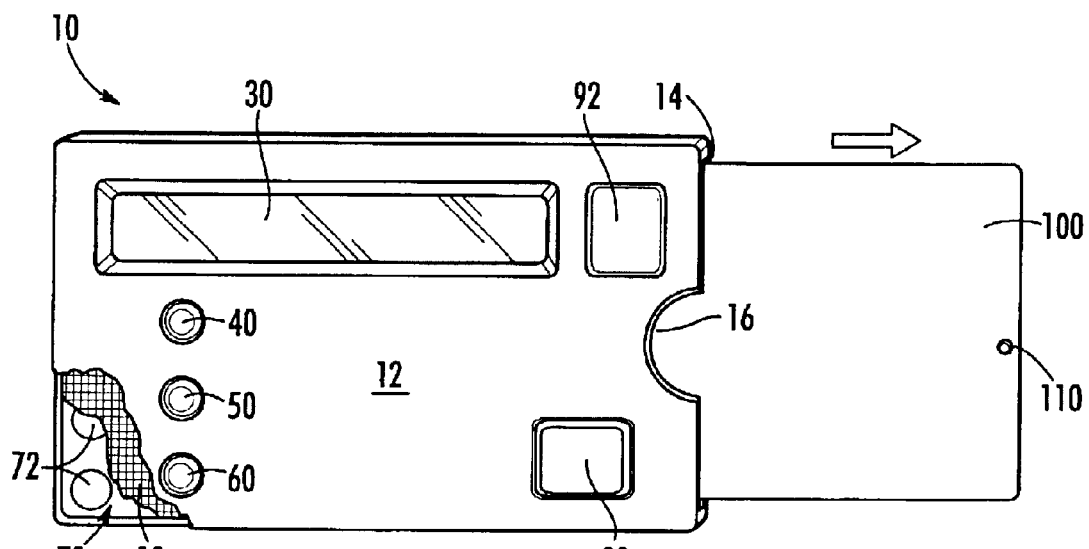
FIG. 1B is a perspective view of the host and drone card of FIG. 1A showing removal of the drone card from the host.
Figure 1C:
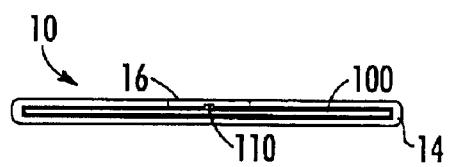
FIG. 1C is a side view of the host along line 1C—1C of FIG. 1A.

FIGS. 1A, 1B and 1C illustrate a host 10 carrying a drone card 100 in accordance with the present invention. Host 10 has a front face 12 and slot 14 for receiving drone card 100. Preferably, host 10 is formed from a relatively rigid material and is no thicker than required to receive drone card 100 and house the requisite electronics. Often, host 10 will have a thickness no greater than about three times that of a standard credit card. While slot 14 is shown on a short side of host 10, it should be understood that slot 14 could be located along any side of host 10. For example, it may be desirable in some cases to locate slot 10 along a long edge of host 10 in order to make drone card 100 more easily removable by either left or right handed people. A cut-out portion 16 proximate to slot 14 allows access to drone card 100 by a user's finger to facilitate its removal from host 10. Host 10 could also be integrated into other electronic devices, such as cellular phones or Personal Digital Assistants (PDAs).

The interior of host 10 may contain an appropriate anti-tampering mechanism to prevent someone from attempting to obtain the account information stored in the host. For example, the illustrated embodiment of host 10 includes a fine mesh 18 of wires just below its surface. The wires of mesh 18 may be serially connected so that any break in the mesh will remove all data stored in host 10. It will be appreciated that attempts to open host 10 will result in mesh breakage.

Host 10 preferably contains an integrally mounted authentication sensor 20 for validating the identification of the user. Authentication sensor 20 is preferably a suitable biometric sensor, such as a fingerprint sensor. One fingerprint sensor that may be used for this purpose is known as FINGER-LOC™ and is sold by AuthenTec, Inc. of Melbourne, Fla. It should be understood that authentication sensor 20 could be any other suitable means for validating the identification of the user, such as a personal identification number (PIN) keypad.

In the illustrated embodiment, host 10 contains a display 30 that allows a user to view information relating to various card accounts stored on host 10. While display 30 is preferably a character liquid crystal display ("LCD"), any other suitable display could be used. Methods for driving a LCD with particular characters are known in the art.

A scroll button 40 mounted on front face 12 of host 10 allows the user to scroll through the names of the various card accounts stored on host 10 to which the user has access. As the user scrolls through the names of the card accounts, each can be shown on display 30. Once the user determines a specific card account to be used, the enter button 50 is used to select the desired card account. Information corresponding with the selected card account is then uploaded along with a security code to drone card 100 as discussed in detail below. Information regarding a particular card account can also be viewed on display 30 by selecting display button 60. It should be appreciated that display scroll button 40, enter button 50 and display button 60 could be formed as a slide switch or other user input device.

Host 10 contains an interface 70 for downloading user data from enroller 200 (FIG. 5) and uploading card data to drone card 100. Card data includes data corresponding to a specific card account while user data contains information required to validate the user, such as a fingerprint image, and card data for each card account associated with the user. In light of the numerous devices and techniques for exchanging data, the interface could be implemented in a variety of ways, such as using electrical contacts, infrared communications or laser communications. If only a single card account is intended to be transferred to drone card 100, host 10 could permanently write account data on drone card 100. With respect to an electric contact interface, host 10 contains internal electric contacts 72 capable of interfacing with electric contacts on enroller 200 and drone card 100. Enroller 200 preferably contains a card-like connector that can inserted into slot 14 for providing the necessary data to host 10.

Figure 2:
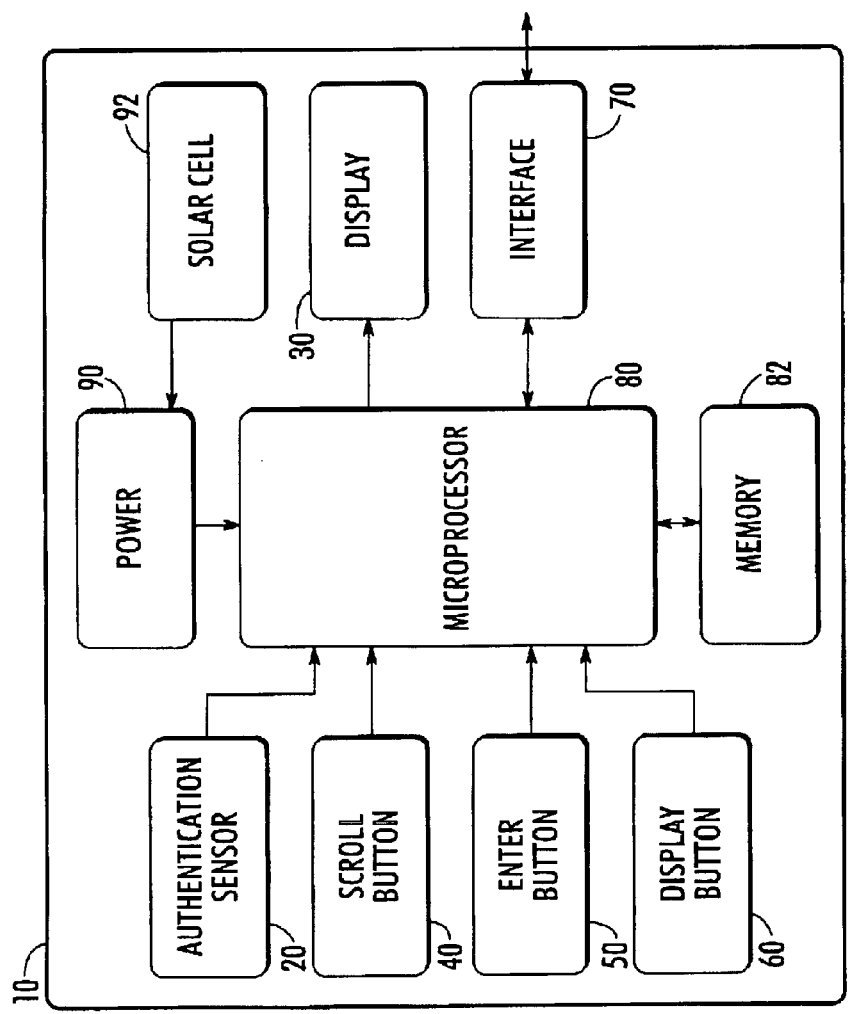
FIG. 2 is a diagrammatic representation of the various functional components of the host of FIGS. 1A–C.

Referring now to FIG. 2, host 10 has an internal microprocessor 80 in electrical communication with on-board memory 82. Memory 82, which is preferably a suitable EEPROM, functions to store card data, user data and security codes (which will be described more fully below). A power source 90, preferably a battery, provides electrical power to microprocessor 80 and memory 82. Preferably an ultra-thin battery will be utilized for this purpose, such as the batteries sold by Power Paper Ltd. of Kibbutz Einat, Israel. Power source 90 may be rechargeable and receive supplemental charging using solar cell 92. An optional indicator light (not shown) may also indicate when the battery is low on power.

Figure 1D:
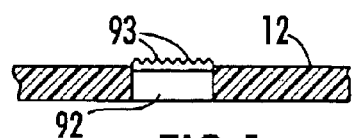
FIG. 1D is a cross sectional view of a portion of the host along line 1D—1D of FIG. 1A.

Means may be optionally provided to magnify or amplify the ambient light available for solar cell 92. For example, in one embodiment an optical prism 93 may be molded into front face 12 of host 10 so as to overlie solar cell 92 as shown in FIG. 1D. The configuration and selection of the appropriate light amplifier should be understood by one of ordinary skill in the art. In order to increase battery life, microprocessor 80 preferably remains in "sleep" mode until activated by authentication sensor 20 or scroll button 40. The term "sleep" mode means a low-power state maintained by the microprocessor until interrupted by input.

Authentication sensor 20, scroll button 40, enter button 50, and display button 60 provide input data to microprocessor 80. Interface 70 also provides input data to microprocessor 80 as well as receiving output data. Microprocessor 80 functions responsively to input data.

Microprocessor 80 responds to the input data from authentication sensor 20 by comparing the input data with the user data stored in memory 82 to determine whether the input data represents a valid user. Multiple users may be associated with a host; consequently, the user data for the host may correspond to more than one person. For example, if authentication sensor 20 were a fingerprint sensor, the fingerprints for each person associated with host 10 would provide access to selected card accounts stored on host 10.

Figure 6:
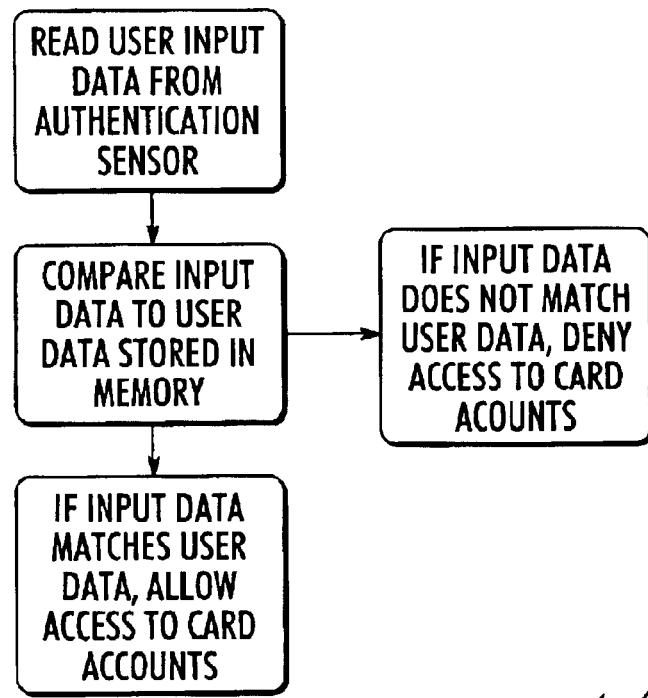
FIG. 6 is a flow chart illustrating the authentication process.

Referring to FIG. 6, the first step in authenticating a user is to read the user input data from authentication sensor 20, such as by scanning the user's fingerprint. Next, the host will compare the data scanned by authentication sensor 20 with user data stored in the memory of the host. If the scanned data does not match the user data stored in memory, the user will not be allowed access to card accounts. Alternatively, if the scanned data matches the user data stored in memory, the user will be provided access to all card accounts to which that user has access.

Not every user associated with the host can necessarily access each card account stored on the host. The host can provide multiple levels of security to restrict certain users from gaining access to certain card accounts. For example, consider a host containing a fingerprint sensor for its authentication sensor that has card data stored in memory for "Card A" (e.g. VISA) and "Card B" (e.g. American Express) along with user data for "User A" and "User B." Therefore, both "User A" and "User B" can activate the host using their fingerprints. Based upon the user data in this example, "User A" is associated with and can access "Card A," but not "Card B." When "User A" scrolls through the available cards on the host, only "Card A" is displayed. The user data, however, associates "User B" with both "Card A" and "Card B". As a result, "User B" can view and use both "Card A" and "Card B."

Upon authentication, microprocessor 80 responds to the input from scroll button 40 by driving display 30 with the identification of the next card account in the user data associated with the user. By continuing to select the scroll button, the user could review the entire list of card accounts stored on host 10 to which the user has access. In response to the input from display button 60, microprocessor 80 displays the card data (e.g. account number) for the selected card account in conjunction with a security code. Microprocessor 80 responds to the input from enter button 50 by uploading card data in conjunction with a security code to drone card 100 via interface 70. Optionally, drone card 100 could have memory containing card data so that only the security code is uploaded to drone card 100.

A security code is a unique code associated with a card account and transaction. Although the card account remains constant, the security code is typically different for each transaction. If someone attempts to reuse a security code, the transaction will be denied as unauthorized. For example, if the selected card account is a telephone card, the telephone company will not authorize charges unless both the card account number and the expected security code is provided. If a third party intercepts the card number and a prior security code for later use, the telephone company will deny the charges. This authorization process is illustrated in the table of FIG. 8.

The security code is preferably a 4-digit alphanumeric code generated based upon an algorithm residing on the host. For example, the security code could randomly change based upon an internal clock residing on host 10. The security code could change during a certain time interval, such as 20 seconds, to provide for increased security. The central computer that validates the security code would be synchronized with the host to recognize the security code. Alternatively, multiple security codes could be stored in the memory of the host. In order to validate the security code, the reader performing the transaction provides the current security code to the central computer of the issuing entity, which then checks for a match with the expected code. This computer is programmed to expect a particular security code in the next transaction to be performed.

Figure 3A:
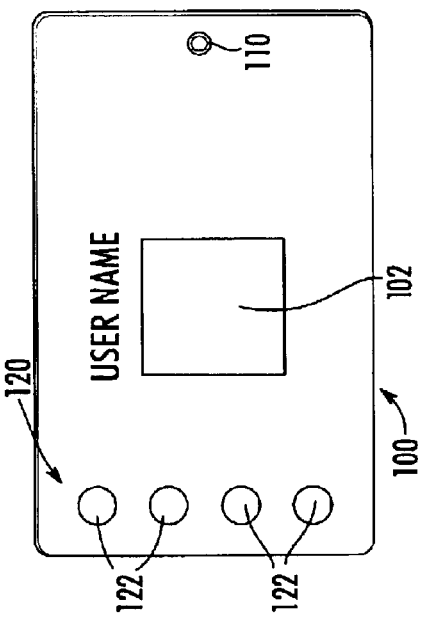
FIG. 3A is a front view of a drone card such as may be used with the host of FIGS. 1A–C.
Figure 3B:
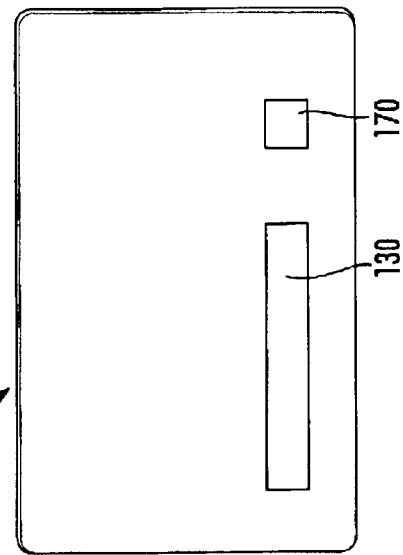
FIG. 3B is a rear view of the drone card of FIG. 3A.

As can be seen in FIGS. 3A and 3B, drone card 100 preferably has a similar size and thickness of a standard credit card. Unlike a credit card that contains an account number visible to anyone viewing the credit card, however, drone card 100 preferably contains no visible information, except optionally the name of the user or group associated with the drone card. Optionally, a photograph 102 of the authorized user is provided on host 12 or drone card 100. Photograph 102 may be a permanent, static photograph of the authorized user or could be an electronic display that temporarily displays an electronic photograph of an authorized user. If an electronic photograph is used, the photograph corresponding with the user authorized by host 100 will be displayed. Accordingly, multiple photographs of users could be stored on host 10 with the appropriate photograph being transferred to drone card 100 and displayed based upon the particular user that is authorized.

All information needed to perform a transaction with drone card 100 is provided at readable identifier 130 when in an active state. In the active state, readable identifier 130 allows user to perform a transaction. At other times, readable identifier 130 will be disabled such that no transactions can be performed. A status indication light 110 may be provided to indicate the state of readable identifier 130. For example, light 110 may be a green LED which is lighted when readable identifier is active. For visually impaired persons, an audible indicator could be provided to indicate changes in the state of readable identifier 130.

Drone card 100 contains an interface 120 for receiving card data from host 10. As noted above, since there are numerous devices and techniques for exchanging data, interface 120 could be implemented in a variety of ways, such as using electric contacts, infrared or laser communications. With respect to an electric contact interface, drone card 100 contains electric contacts 122 capable of interfacing with electric contacts 72 on host 10.

Figure 4:
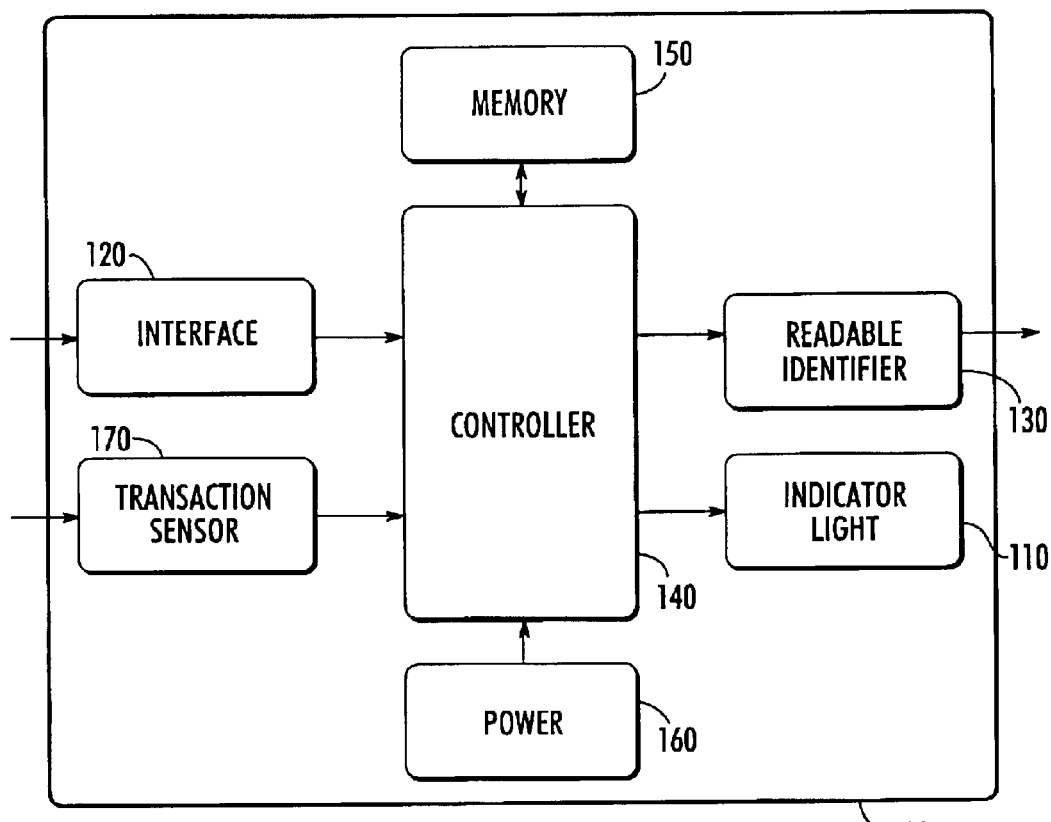
FIG. 4 is a diagrammatic representation of the various functional components of the drone card of FIGS. 3A and 3B.

Referring now to FIG. 4, the internal construction of one preferred embodiment of drone card 100 will be described. In this case, drone card 100 has an internal controller 140 in electrical communication with on-board memory 150, which is preferably a volatile memory. In this embodiment, drone card 100 has sufficient memory to store card data in conjunction with a security code. A power source 160, preferably an ultra-thin battery as described above, provides electrical power to controller 140 and memory 150. Power source 160 may be rechargeable by receiving power from host 10 through galvanic connection, induction or other suitable means.

As noted above, drone card 100 contains an interface 120 in electrical communication with controller 140 that transfers card data received from host 10 for storage in memory 150. As mentioned previously, the art contains numerous techniques for transferring data, such as using electric contacts, laser communications and infrared communications.

Figure 7:
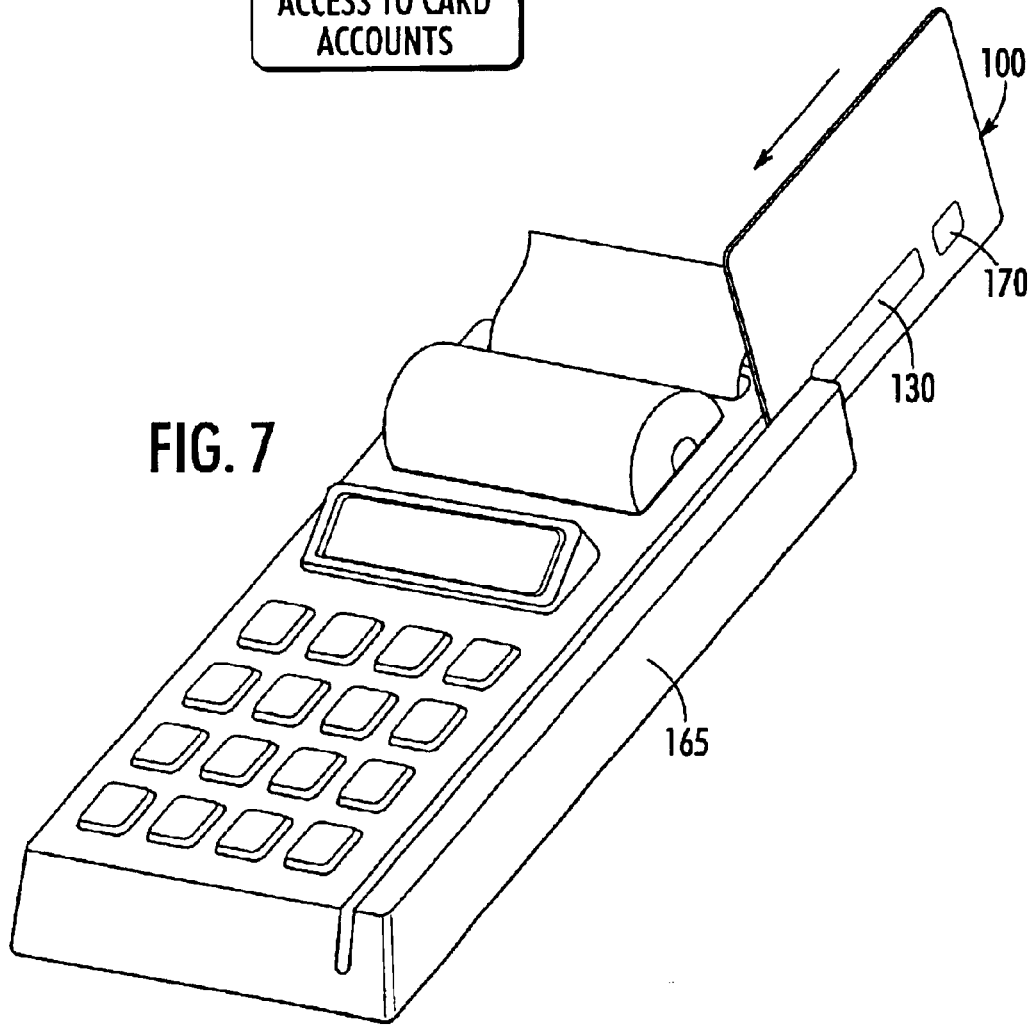
FIG. 7 is a perspective view of a drone card being scanned by a credit card reader of the type currently in widespread use.

Controller 140 generates a signal to activate readable identifier 130 based upon card data received from host 10. Preferably, readable identifier 130 will be in a form that is compatible with existing readers such as conventional card reader 165 shown in FIG. 7. For example, readable identifier 130 could be a temporary magnetic stripe or a bar code display that is temporarily activated following authentication.

To generate a temporary magnetic stripe, the drone card may include an electric matrix to create a magnetic signal corresponding to the card account. For a discussion regarding the generation of a temporary magnetic signal using an electric matrix, see U.S. Pat. No. 6,089,451 to Krause, incorporated herein by reference.

Alternatively, readable identifier 130 could be generated using a magnetic powder or other material housed within drone card 100. Host 10 could change the physical position or configuration of the powder to generate various readable identifiers. For example, the powder could be oriented to produce a temporary magnetic stripe that could be read by a standard card reader.

Alternatively, readable identifier 130 could be a LCD or other suitable display for producing a bar code corresponding to the card data. Based upon the card data, host 10 would transfer data sufficient to generate a corresponding bar code to drone card 100 for display on the LCD. The bar code shown on readable identifier 130 will be different for each card account transferred to drone card 100.

Instead of using a magnetic card reader with this type of drone card 100, a bar code reader could scan the drone card. For example, if the card account residing in the memory of the drone card was a credit card, the bar code corresponding to the credit card would be displayed as the readable identifier. A bar code reader would read the readable identifier and communicate with the necessary credit authorities to charge the appropriate account.

As noted above, the state of status indicator light 110 indicates whether the drone card is ready for use. When card data is initially transferred to drone card 100, status indicator light 110 may become illuminated. In such embodiments, status indicator light 110 will preferably remain illuminated until the readable identifier becomes disabled. Preferably, the readable identifier may become disabled either (1) upon completing a transaction or (2) upon passage of a certain period of time. In many embodiments, controller 140 may simply remove the power to the readable identifier in order to disable the readable identifier.

Drone card 100 may contain a transaction sensor 170 that detects when a transaction with the drone card has been attempted. For example, if the drone card is configured to be scanned by a magnetic reader, transaction sensor 170 would detect scanning of the drone card by the magnetic reader. Once the drone card has been scanned, the readable identifier preferably becomes disabled.

In another embodiment, drone card 100 may not contain an internal power source. For example, drone card 100 could be configured having a readable identifier, such as a magnetic strip, which does not require continuous power to remain readable. In such embodiments, host 10 would contain an output circuit, such as a magnetic head, which would write card account data to the magnetic strip. As drone card 100 is pulled from host 10, the magnetic head may write card account data to magnetic strip. A security code may also be written to drone card. A roller or generator within host 10 could be provided to synchronize writing of data onto drone card 100.

Figure 5:
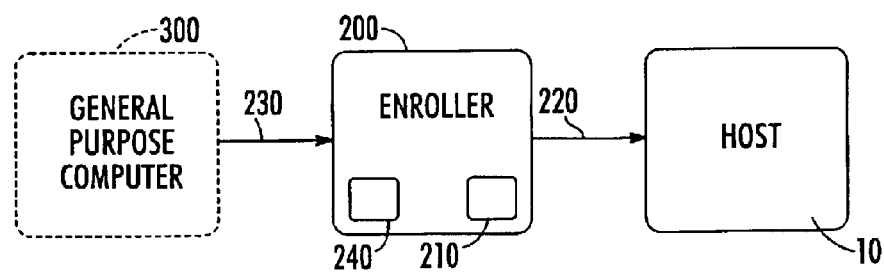
FIG. 5 is a diagrammatic representation of an enroller interfacing with a host according to an embodiment of the present invention.

Referring now to FIG. 5, enroller 200 initializes host 10 with user data and card data (and in some cases security codes). Enroller 200 may be a free-standing device or a peripheral to a general-purpose computer 300. In this latter case, enroller 200 communicates with computer 30 via an interface 230. As one skilled in the art will recognize, interface 230 could be implemented using numerous techniques, such as a serial line, wireless communications, or any other suitable data transfer technique.

General-purpose computer 300 contains software for gathering user data, including collecting information necessary to authenticate the user. General information about a user, such as name, address, social security number, et cetera, can be keyed into general purpose computer 300. Enroller 200 contains an authentication sensor 210 for collecting information needed to authenticate the user. For example, if host 10 contains a fingerprint sensor, enroller 200 would collect a fingerprint image from the user. Enroller 200 could have a separate fingerprint sensor to perform this function or use the fingerprint sensor residing on host 10. Enroller 200 may also contain a sensor 240 for collecting card data for each "card" to be stored on the host. Sensor 240 could be a standard transaction card reader.

An interface 220 transfers user data (and possibly security codes) to host 10. As previously noted, the art contains numerous devices and techniques for transferring data. For example, enroller 200 could communicate using the electrical contacts on the host.

Figure 10:
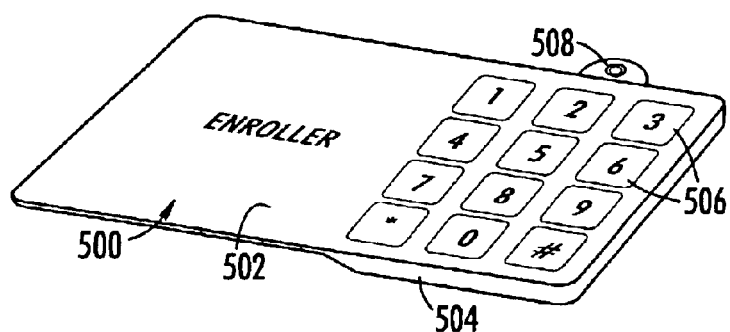
FIG. 10 is a perspective view of an enroller according to an alternative embodiment.
Figure 11:
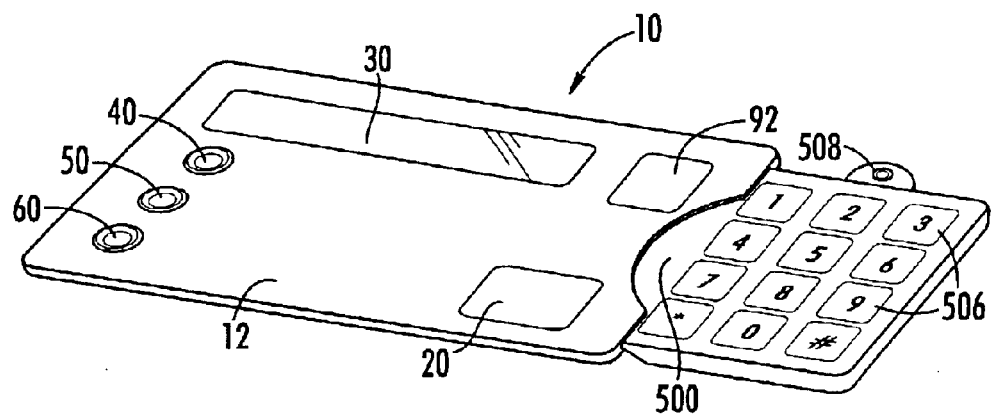
FIG. 11 is a perspective view of the enroller of FIG. 10 received within the host.
Figure 12:
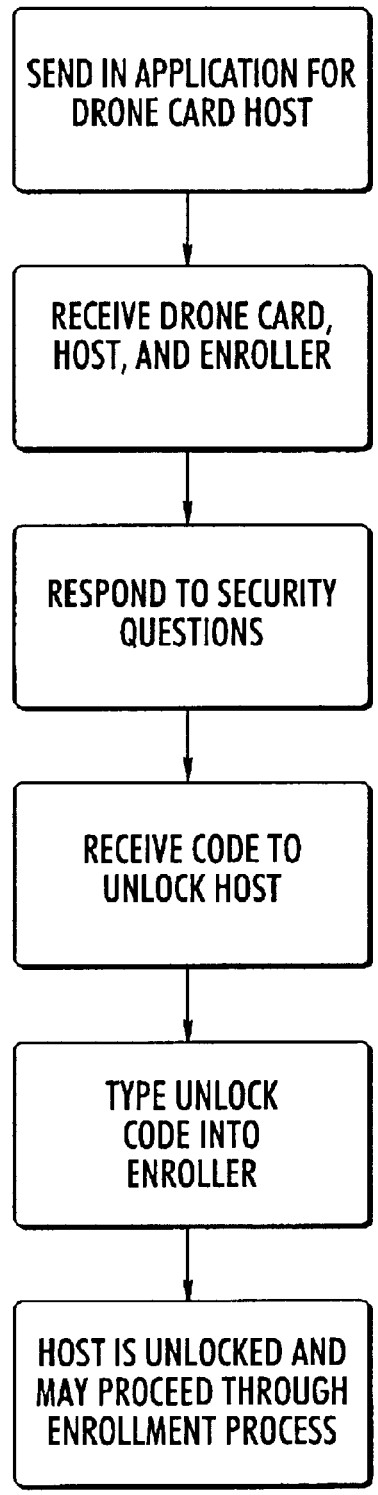
FIG. 12 is a flow chart showing the enrollment process according to the embodiment of FIGS. 10 and 11.

FIGS. 10–12 illustrate another embodiment for an enroller 500. In this embodiment, enroller 500 may have a card-like portion 502 that may be received in slot 14 of host 10. While it should be appreciated that entire enroller 500 may have the thickness of card-like portion 502, the portion not received within host 10 may be thicker, such as for purposes of durability. Enroller 500 contains a user input device 506, such as a keypad, for entering an unlock code into host 10. Enroller 500 also contains an interface (not shown) to communicate with host 10. Enroller 500 may interface with host 10 in a similar manner as drone card 100, such as using electrical contacts, laser communications, infrared communications or other communication means.

In this embodiment, a disabled host 10 and drone card 100 may be shipped to a user, along with enroller 500. In order to enable host 10, the user must obtain an unlock code from the issuer of host 10 and drone card 100. Accordingly, the user will communicate with the issuer of host 10 and drone card 100 to receive an unlock code. The user could obtain the unlock code using the issuer's website, or merely calling the issuer using a telephone. In order to obtain the unlock code, the user will be required to answer a series of security questions to authenticate the user. Once satisfied with the answers to the security questions, the issuer can issue the unlock code to the user. With enroller 500 received within host 10, the user will enter the unlock code into enroller 500, which will unlock host 10. It should be appreciated that a host 10 may be matched to a particular enroller 500. Moreover, enroller 500 could be designed for a one time use to prevent a single enroller from being used on multiple hosts.

With host 10 enabled, the user may proceed with the enrollment process. For example, the user can setup an account using authentication sensor 20 of host 10 and type in information for card accounts into user input device 506 of enroller 100. Instructions for the enrollment process could be shown on display 30 of host 10. Additionally, enroller 100 could contain a digital camera means 508 for transferring a digital photograph of a user to host 10.

To use the host, the user must be validated using the authentication sensor. If the authentication sensor is a fingerprint sensor, for example, the fingerprint of the user must be validated to access card accounts stored on the host. Once authenticated, the user can display using the scroll button the identification of all card accounts stored on the host to which that user has access. Once the identification of the desired card account is displayed, the user can display the card data in conjunction with a security code for the selected "card" using the display button. To upload the card data and security code to the drone card, the user selects the enter button.

Once the host transfers the card data and security code to the drone card, the status indicator light is illuminated (if the drone card is powered and so equipped). To use the card for a transaction, the user removes the card from the host so that the readable identifier is exposed to a reader. Once the readable identifier is exposed to a reader, the readable identifier becomes preferably disabled and the status indicator light turns off. If a certain period of time passes before the readable identifier is exposed to a reader, the readable identifier also becomes preferably disabled and the status indicator light turns off. The user then returns the drone card to the host until needed for another transaction. It will be appreciated that the display allows the account number and security code to be seen so that transactions can be approved by call-in when necessary, such as where (rarely) the vendor does not have a suitable card reader.

FIGS. 9A and 9B illustrate an alternative embodiment in which the functionality of the host and drone card, previously discussed, is integrated into an encoded card 400. Encoded card 400 is preferably approximately the same thickness of a standard credit card.

Encoded card 400 preferably contains an integrally mounted authentication sensor 410 for validating the identification of the user. Any suitable sensor capable of identifying the user, such as a biometric sensor, could be used.

Optionally, a photograph 402 of the authorized user is provided on encoded card 400. Photograph 402 may be a permanent, static photograph of the authorized user or could be an electronic display that temporarily displays an electronic photograph of an authorized user. If an electronic photograph is used, the photograph corresponding with the authorized user will be displayed. Accordingly, multiple photographs of users could be stored on encoded card 400 with the appropriate photograph being displayed based upon the particular user that is authorized.

Encoded card 400 includes a display 420 that allows a user to view information relating to various card accounts stored on encoded card 400. A scroll button 430 mounted on encoded card 400 allows the user to scroll through the names of the various card accounts stored on encoded card 400 to which the user has access. As the user scrolls through the names of the card accounts, each is shown on display 420.

Once the user determines a specific card account to be used, the enter button 440 is used to select the desired card account. As a result, the readable identifier 480 (FIG. 9B) provides a signal, such as a temporary magnetic stripe or a bar code display that is temporarily activated following authentication, that allows completion of a transaction. Upon selecting the desired card account, an indicator light 450 displays the state of the readable identifier. As discussed previously, the indicator light indicates whether the readable identifier is enabled or disabled. Transaction sensor 490 may be provided to detect when a transaction with the encoded card has been attempted. Information regarding a particular card account can also be viewed on display 420 by selecting display button 470. In order to increase battery life, solar cell 460 may be included to supply power to encoded card 400. A prism 462 or other suitable means may be provided to increase light available for solar cell 460 as seen in FIG. 9C.

It can thus be seen that the present invention provides a transaction card system having novel properties. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention.

What is claimed is:

1. A transaction card system, said system comprising:
   a host;
   a drone card having drone memory;
   said host being adapted to physically receive a portion of said drone card during a data transfer operation from said host to said drone card;
   said host having:
      a host memory configured to store account information regarding at least one transaction card;
      an output circuit configured to generate an electronically readable identifier corresponding to said at least one transaction card stored in said memory;
      a user input device configured to select a transaction card stored in said memory;
      a processor operatively coupled to said memory, output circuit and said user input device, wherein said output circuit generates a readable identifier responsive to input received from said user input device; and
   wherein said readable identifier includes an automatically generated security code that is transferred to said drone card and is capable of being transmitted to a remote computer to authenticate a transaction, said security code being a randomly changing code pattern which is known by said host and said remote computer, said security code changing with each transaction.

2. The system as recited in claim 1, further comprising a security input device operatively coupled to said processor, wherein said security input device limits access to account information stored in said memory based upon the input received by said security input device.

3. The system as recited in claim 2, wherein said security input device is an authentication sensor.

4. The system as recited in claim 3, wherein said authentication sensor is a biometric sensor.

5. The system as recited in claim 3, wherein a first user has access to a first set of account information stored in said memory based upon input received by said authentication sensor and a second user has access to a second set of account information based upon input received by said authentication sensor.

6. The system as recited in claim 5, wherein said authentication sensor is a fingerprint sensor.

7. The system as recited as claim 1, wherein said readable identifier generated by said output circuit is a magnetic signal.

8. The system as recited in claim 1, wherein said readable identifier generated by said output circuit is a bar code.

9. The system as recited in claim 1, wherein said security code is based upon an encryption algorithm.

10. The system as recited in claim 1, further comprising a status indicator operatively coupled to said processor, said status indicator configured to switch between a disabled state and an enabled state wherein said status indicator becomes enabled when said output circuit generates a readable identifier.

11. The system as recited in claim 10, wherein said status indicator becomes disabled upon being read by a card reader.

12. The system as recited in claim 10, wherein said status indicator becomes disabled when a predetermined period of time elapses after said output circuit generates a readable identifier.

13. The system as recited in claim 10, wherein said status indicator is a light that is illuminated when said status indicator is enabled.

14. The system as recited in claim 10, wherein said status indicator is a light that illuminates a first color when said status indicator is enabled and a second color when said status indicator is disabled.

15. The system as recited in claim 10, wherein said status indicator provides a first audible sound when said status indicator is enabled and a second audible sound when said status indicator is disabled.

16. The system as recited in claim 1, further comprising an interface operatively coupled to said processor for downloading account information.

17. The system as recited in claim 1, further comprising a display operatively coupled to said processor, said display showing account information stored in said memory responsive to said user input device.

18. The system as recited in claim 1, wherein said security code randomly changes based upon said internal clock residing on said host.

19. The system as recited in claim 1, wherein said security code changes after a predetermined time interval.

20. The system as recited in claim 19, wherein said security code changes at least every twenty seconds.

21. A transaction card system, said system comprising:
   a drone card having a drone memory, a drone interface and an output circuit configured to generate a readable identifier corresponding to account information stored in said drone memory;
   a host having a slot for receiving said drone card, said host having:
      a host memory configured to store account information for at least one transaction card,
      a host interface configured to communicate with said drone interface to transfer account information to said drone card,
      a biometric sensor;
      a processor operatively connected to said host memory, said host interface and said biometric sensor, wherein said host transfers account information to said drone memory when a user has been verified via said biometric sensor;
   an enroller having a card-like portion configured to be received within said slot of said host, said enroller having a user input device capable of communicating with said host; and
   wherein said host is configured to switch between a disabled state that prevents use of said host and an enabled state that allows use of said host, said host switching to said enabled state responsive to input received from said user input device of said enroller.

22. The system as recited in claim 21, wherein said biometric sensor is a fingerprint sensor.

23. The system as recited in claim 21, wherein a first user has access to a first set of account information stored in said host memory based upon input received by said biometric sensor and a second user has access to a second set of account information based upon input received by said biometric sensor.

24. The system as recited as claim 21, wherein said readable identifier generated by said output circuit of said drone card is a magnetic signal.

25. The system as recited in claim 21, wherein said readable identifier generated by said output circuit of said drone card is a bar code.

26. The system as recited in claim 21, wherein said readable identifier generated by said drone card includes a security code.

27. The system as recited in claim 26, wherein said security code differs for each transaction.

28. The system as recited in claim 26, wherein said security code sequentially changes for each transaction.

29. The system as recited in claim 26, wherein said security code is based upon an encryption algorithm.

30. The system as recited in claim 21, wherein said drone card further comprises a status indicator, said status indicator configured to switch between a disabled state and an enabled state wherein said status indicator becomes enabled when said output circuit of said drone card generates a readable identifier.

31. The system as recited in claim 30, wherein said status indicator becomes disabled when a predetermined period of time elapses after output circuit generates a readable identifier.

32. The system as recited in claim 30, wherein said status indicator is a light that is illuminated when said status indicator is enabled.

33. The system as recited in claim 21, wherein said drone interface and said host interface communicate using electrical contacts.

34. The system as recited in claim 21, wherein said drone interface and said host interface communicate using wireless communications.

35. The system as recited in claim 21, wherein said drone interface and said host interface communicate using laser communications.

36. The system as recited in claim 21, wherein said drone interface and said host interface communication using infrared communications.

37. The system as recited in claim 21, wherein said host includes a solar cell as a source of power.

38. The system as recited in claim 37, further comprising a light amplifier operatively connected to said solar cell.

39. The system as recited in claim 38, wherein said light amplifier is at least one prism overlying said solar cell.

40. The system as recited in claim 21, wherein said host includes anti-tampering means for erasing said host memory in the event that said host becomes damaged.

41. The system as recited in claim 21, wherein said drone card includes anti-tampering means for erasing said drone memory in the event that said drone card becomes damaged.

42. The system as recited in claim 21, wherein said drone card has approximately the same thickness as a standard credit card.

43. The system as recited in claim 42, wherein said host has approximately three-times the thickness of a standard credit card.

44. The system as recited in claim 21, further comprising a user input device configured to select account information for a transaction card stored in said host memory.

45. The transaction card system as recited in claim 21, wherein said enroller becomes disabled upon enabling said host.

46. The system as recited in claim 21, wherein said enroller is electronically keyed to said host.

47. A method for enrolling a transaction card system having a drone card and a host adapted to receive a portion of said drone card during a data transfer operation from said host to said drone card, said method comprising the steps of:
   (a) sending a drone card and disabled host to a user;
   (b) receiving a communication from said user;
   (c) requiring said user to answer at least one security question; and
   (d) upon satisfactory completion of step (c), providing said user with a security code which will enable said host, such that once enabled, said host functions transfer card data to said drone card.

48. The method as recited in claim 47, wherein said communication of step (b) is a phone call.

49. The method as recited in claim 47, wherein said host is preprogrammed with account information.

50. The method as recited in claim 47, wherein an enroller having a user input device is also sent in step (a).

51. The method as recited in claim 50, wherein said user enters said security code into said user input device of said enroller to enable said host.

52. A transaction card system, said system comprising:
- a drone card having a drone memory, a drone interface and an output circuit configured to generate a readable identifier corresponding to account information stored in said drone memory, said drone card having a display;
- a host having a slot for receiving said drone card, said host having:
  - a host memory configured to store account information for at least one transaction card,
  - a host interface configured to communicate with said drone interface to transfer account information to said drone card,
  - a biometric sensor;
  - a processor operatively connected to said host memory, said host interface and said biometric sensor, wherein said host transfers account information to said drone memory when a user has been verified via said biometric sensor; and
- wherein said display on said drone card, shows a photograph of the user based upon biometric information received from the biometric sensor of said host.

53. A transaction card system, said system comprising:
- a drone card having a drone memory, a drone interface and an output circuit configured to generate a readable identifier corresponding to account information stored in said drone memory;
- a host having a slot for receiving said drone card, said host having:
  - a host memory configured to store account information for at least one transaction card,
  - a host interface configured to communicate with said drone interface to transfer account information to said drone card,
  - a biometric sensor,
  - a display showing a photograph of the user based upon biometric information received from said biometric sensor; and
  - a processor operatively connected to said host memory, said host interface and said biometric sensor, wherein said host transfers account information to said drone memory when a user has been verified via said biometric sensor.

54. A method for enrolling a transaction card having a drone card and a host adapted to receive a portion of said drone card during a data transfer operation from said host to said drone card, said method comprising the steps of:
- (a) sending a drone card, disabled host, and an enroller having a user input device to a user;
- (b) receiving a communication from said user;
- (c) requiring said user to answer at least one security question;
- (d) upon satisfactory completion of step (c), providing said user with a security code that can be inputted into said user input device of said enroller to enable said host, such that once enabled, said host functions transfer card data to said drone card; and
- wherein said enroller becomes disabled upon enabling said host.

55. A method for enrolling a transaction card having a drone card and a host adapted to receive a portion of said drone card during a data transfer operation from said host to said drone card, said method comprising the steps of:
- (a) receiving a drone card, disabled host, and an enroller having a user input device;
- (b) answering at least one security question to obtain an unlock code;
- (c) entering said unlock code into said user input device of said enroller to enable said host, such that once enabled, said host functions transfer card data to said drone card; and
- (d) entering account information for at least one transaction card into said host.

56. A transaction card system, said system comprising:
- a host;
- a drone card having drone memory;
- said host being adapted to physically receive a portion of said drone card during a data transfer operation from said host to said drone card;
- said host having:
  - a host memory configured to store account information regarding at least one transaction card;
  - an output circuit configured to generate an electronically readable identifier corresponding to said at least one transaction card stored in said memory;
  - a user input device configured to select a transaction card stored in said memory;
  - a processor operatively coupled to said memory, output circuit and said user input device, wherein said output circuit generates a readable identifier responsive to input received from said user input device; and
- wherein said readable identifier includes an automatically generated security code that is transferred to said drone card and is capable of being transmitted to a remote computer to authenticate a transaction, said security code being chosen from a set of multiple security codes stored in said memory based on an internal clock residing in said host.

* * * * *